(12) United States Patent
Fisher et al.

(10) Patent No.: US 8,731,745 B2
(45) Date of Patent: May 20, 2014

(54) SEQUENCE DIAGRAM SYSTEM

(75) Inventors: Steven C. Fisher, Simi Valley, CA (US); Tim Brodeur, Folsom, CA (US)

(73) Assignee: Aerojet Rocketdyne of DE, Inc., Sacramento, CA (US)

( * ) Notice: Subject to any disclaimer, the term of this patent is extended or adjusted under 35 U.S.C. 154(b) by 1064 days.

(21) Appl. No.: 12/165,703

(22) Filed: Jul. 1, 2008

(65) Prior Publication Data

US 2010/0017055 A1 Jan. 21, 2010

(51) Int. Cl.
*G01P 21/00* (2006.01)
(52) U.S. Cl.
USPC .............. 701/15; 702/108; 702/123; 707/800
(58) Field of Classification Search
USPC .............. 701/29, 15; 702/108, 117, 118, 123; 707/790–801; 60/645
See application file for complete search history.

(56) References Cited

U.S. PATENT DOCUMENTS

| | | | |
|---|---|---|---|
| 2,949,007 A * | 8/1960 | Aldrich et al. ................... | 60/259 |
| 3,170,295 A * | 2/1965 | Dryden ......................... | 60/39.48 |
| 3,516,254 A * | 6/1970 | Hammond ...................... | 60/260 |
| 4,583,362 A * | 4/1986 | Wagner ........................... | 60/259 |
| 4,889,187 A | 12/1989 | Terrell et al. | |
| 5,052,176 A * | 10/1991 | Labatut et al. .................. | 60/225 |
| 5,177,362 A | 1/1993 | Reitman et al. | |
| 5,185,526 A | 2/1993 | Reitman et al. | |
| 5,437,030 A | 7/1995 | Reitman et al. | |
| 5,444,973 A * | 8/1995 | Limerick et al. ................ | 60/204 |
| 5,617,318 A | 4/1997 | Clark | |
| 5,721,680 A | 2/1998 | Van Cleve et al. | |
| 5,992,290 A | 11/1999 | Quebedeaux et al. | |
| 6,003,808 A | 12/1999 | Nguyen et al. | |
| 6,006,145 A | 12/1999 | Bessacini | |
| 6,052,987 A * | 4/2000 | Dressler ......................... | 60/260 |
| 6,125,312 A | 9/2000 | Nguyen et al. | |
| 6,226,980 B1 * | 5/2001 | Katorgin et al. ................ | 60/258 |
| 6,269,319 B1 | 7/2001 | Neisch et al. | |
| 6,397,378 B1 * | 5/2002 | Grey et al. ..................... | 717/175 |
| 6,519,554 B1 | 2/2003 | Gieseke et al. | |
| 6,526,356 B1 * | 2/2003 | DiMaggio et al. ............. | 702/35 |
| 6,530,213 B2 * | 3/2003 | Beck et al. ...................... | 60/204 |
| 6,769,242 B1 * | 8/2004 | Balepin ........................... | 60/204 |
| 7,043,343 B1 | 5/2006 | Houlberg et al. | |
| 7,207,517 B2 | 4/2007 | McKendree et al. | |
| 7,216,477 B1 * | 5/2007 | Erickson et al. ................ | 60/259 |
| 7,306,710 B2 | 12/2007 | Schepel et al. | |
| 7,334,396 B2 | 2/2008 | Erickson et al. | |
| 7,477,966 B1 * | 1/2009 | Mango ............................ | 701/13 |
| 7,900,436 B2 * | 3/2011 | Greene ........................... | 60/260 |
| 7,997,060 B2 * | 8/2011 | Erickson et al. ................ | 60/259 |
| 2004/0093180 A1 * | 5/2004 | Grey et al. ..................... | 702/123 |
| 2005/0193263 A1 * | 9/2005 | Watt ............................... | 714/38 |
| 2005/0268171 A1 * | 12/2005 | House et al. .................... | 714/32 |
| 2009/0292518 A1 * | 11/2009 | Shachar et al. ................ | 703/13 |

* cited by examiner

*Primary Examiner* — James English
(74) *Attorney, Agent, or Firm* — Carlson, Gaskey & Olds P.C.

(57) ABSTRACT

A method of generating a test sequence diagram includes: linking a first action of the plurality of actions with a second action of the plurality of actions and generating a test sequence diagram which maintains the linking.

21 Claims, 18 Drawing Sheets

FIG. 10A

| | FIG. 10A(1) | FIG. 10A(3) |
|---|---|---|
| | FIG. 10A(2) | |

FIG. 10A(1)

Test Information
| Test Article | 5.7" subscale combustor |
|---|---|
| Test Facility | MSFC Test Stand 116 |
| Test Number | P229-001 |
| Date | 5/4/2006 |

Events
| Event Name | Time |
|---|---|
| F/C | 0 |
| C/O | Duration at 2nd Fuel Temp |

Timers
| Timer Name | Arm | Duration (seconds) |
|---|---|---|
| Ignition Detect | F/C+2 | 2 |
| Delay For Closed Loop Control | Fuel S/O Micro 1+.5 | 1 |
| Delay For Fuel Press & Temp Checks | Delay For Closed Loop Control | 1.5 |
| Duration at 1st Fuel Temp | Pc OK | 5 |
| Duration at 2nd Fuel Temp | Duration at 1st Fuel Temp | 5 |

Test Stages
| Test Stage | Start | End |
|---|---|---|
| Chill | -3.2 | Start |
| Pre Ignition | 0 | Ignition |
| Pre-stage | Ignition | Mainstage |
| Mainstage | Mainstage | Cutoff |
| Post Hot-fire | Cutoff | 15.3 |

| Redline/Blueline input | | | | | | | Action if | | | |
|---|---|---|---|---|---|---|---|---|---|---|
| Description | Type (Red/Blue line) | Measurement | Limit | Lines | Type of Limit (Min/Max) | Arm | Disarm | Delay [sec] | Violated | Status |
| Coolant Inlet P Low | RL | P1 | 3000 | psig | Min | F/C+2.25 | C/O | 0.08 | C/O | Active |
| Coolant Water P Low | RL | P2 | 1500 | psig | Min | LOX S/O Micro 1 | C/O+1.4 | | C/O | Active |
| Coolant T High | RL | T1 | 220 | psig | Max | F/C | C/O | 0 | C/O | Active |
| LOX Venturi P High | RL | P3 | 2200 | psig | Max | F/C | C/O | 0.02 | C/O | Active |
| Fuel MFD Accels | RL | A1 | 5 | Gs rms | Max | F/C | C/O | 0 | C/O | Active |
| Hydraulic P Low | RL | P4 | 2000 | psig | Min | F/C | C/O | 0 | C/O | Active |
| Fuel Venturi P Low | RL | P5 | 2500 | psig | Min | Fuel Pressure OK | C/O | | C/O | Active |
| Fuel Inlet P Low | RL | T2 | 150 | R | Max | Fuel Temo Ok | C/O | | C/O | Active |

FIG.10A(2)

Valve Input

| Valve Name | Valve I.D. | Initial State (Close, X%) | Action (Open, Close, X%) | Ramp Rate (%/S) | Trigger (Time/Event/Timer) | Position Sensor Name | Position Sensor Type (MS/POS) |
|---|---|---|---|---|---|---|---|
| 40K LOX Low Purge | 1 | Open | Close | 200 | F/C | | |
| 40K LOX Low Purge | 1 | | Open | 200 | Fuel S/O Micro 2+.5 | | |
| 40K LOX Low Purge | 2 | Open | Close | 200 | F/C | | |
| 40K LOX Low Purge | 2 | | Open | 200 | C/O | | |
| 40K LOX S/O | 3 | Closed | 50 | 200 | F/C+1 | LOX S/O Micro 1 | POS |
| 40K LOX S/O | 3 | | 100 | 200 | Pc OK | | |
| 40K LOX S/O | 3 | | Close | 200 | C/O | LOX S/O Micro 1 | POS |
| 40K TEA Igniter S/O | 4 | Closed | Open | 200 | C/O | TEA Igniter Micro | MS |
| 40K TEA Igniter S/O | 4 | | Close | | LOX S/O Micro 1 | | |
| 40K TEA Igniter Purge | 5 | Open | Close | | TEA Igniter Micro | | |
| 40K TEA Igniter Purge | 5 | | Open | | C/O | | |
| 40K Fuel Shutoff | 6 | Closed | Open | 200 | Ignition Detect | Fuel S/O Micro 1 | MS |
| 40K Fuel Shutoff | 6 | | Close | | Fuel S/O Micro 2+.5 | Fuel S/O Micro 1 | MS |
| 40K Fuel Purge | 7 | Open | Close | | Ignition Detect | | |
| 40K Fuel Purge | 7 | | Open | 200 | Fuel S/O Micro 2+.5 | | |
| 40K Mixer Valve | 8 | Closed | 100 | 200 | Fuel S/O Micro 1 | | |
| 40K Mixer Valve | 8 | | 75 | 200 | Duration at 1st Fuel Temp | | |
| 40K Mixer Valve | 8 | | Close | 200 | Fuel S/O Micro 2+.5 | | |

Data Parameters

| Parameters | Description | Expected Time (seconds) |
|---|---|---|
| Fuel Pressure OK | P1178 | 4.6 |
| Fuel Temp OK | T1160 | 4.8 |
| Pc OK | P7189 | 5 |

FIG.10A(3)

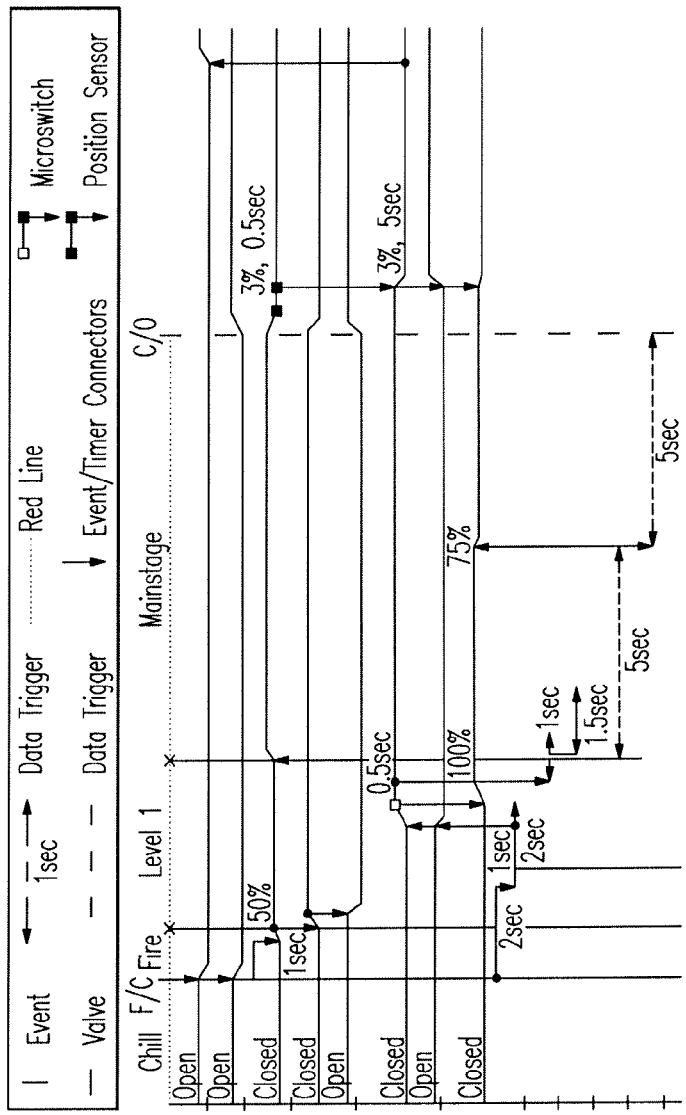
FIG. 10B(1)

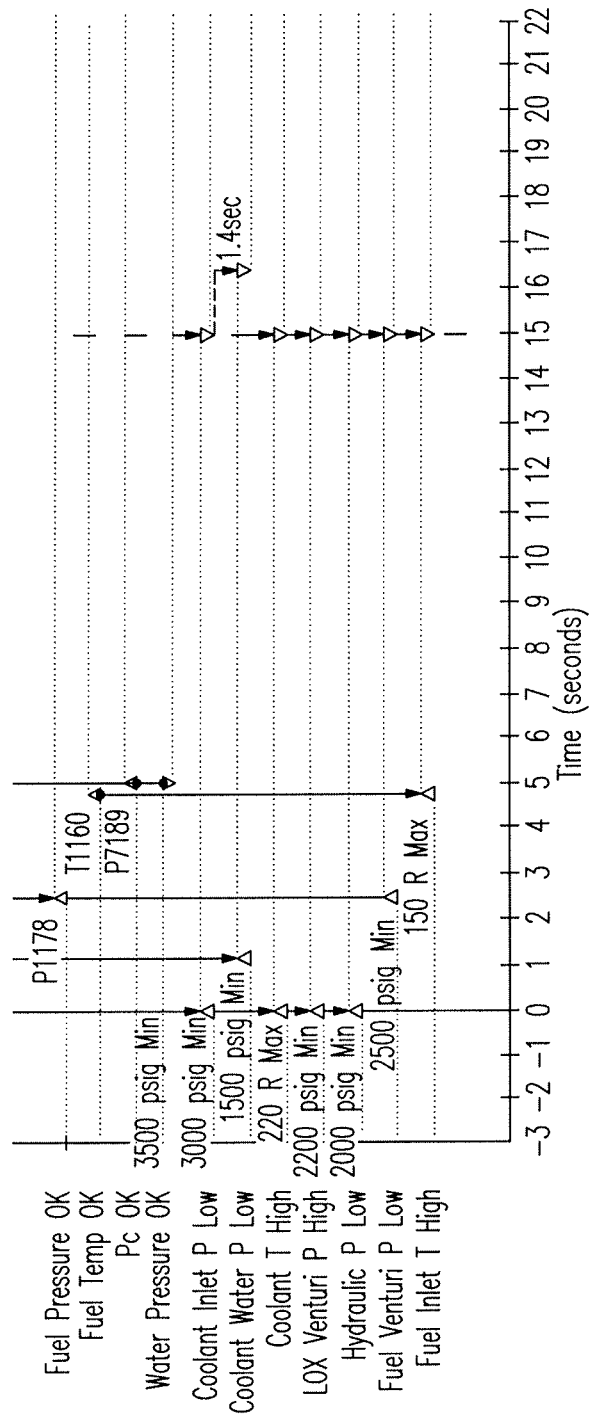
FIG.10B(2)

FIG.11

| | A | B |
|---|---|---|
| 1 | Test Article | 5.7" combustor |
| 2 | Test Facility | MSFC TS116 |
| 3 | Test Number | 001 |
| 4 | Date | 8/21/2006 |
| 5 | REVISION | Rev A |

\\ Test Information \ Events \ Pseud

FIG.12

| | A | B |
|---|---|---|
| 1 | Event name | Time |
| 2 | F/C | 0 |
| 3 | C/O | Duration at 2nd Fuel Temp |
| 4 | | |

\\ Test Information \ Events \ Pseu

FIG.13

| | A | B | C |
|---|---|---|---|
| 1 | Test Stage | Start | End |
| 2 | Chill | −3 | F/C |
| 3 | Fire | F/C | TEA igniter Micro |

\\ Test Information \ Events \ Sequence Labels \ Valves \ RedBlue Lines

| | A | B | C | D | E | F | G | H |
|---|---|---|---|---|---|---|---|---|
| 1 | Valve Name | Valve I.D. | Initial State | Action (Open, Close, X%) | Ramp Rate (%/s) | Trigger (Time/Event/Timer) | Position Sensor Name | Position Sensor Type [MS/POS/%] |
| 2 | 40K LOX Low Purge | 1 | Open | Close | 200 | F/C | | |
| 3 | 40K LOX Low Purge | 1 | | Open | 200 | Fuel S/O Micro2+5 | | |
| 4 | 40K LOX High Purge | 2 | Open | Close | 200 | F/C | | |
| 5 | 40K LOX High Purge | 2 | | Open | 200 | C/O | | |
| 6 | 40K LOX S/O | 3 | Closed | 50 | 200 | F/C+1 | LOX S/O Micro 1 | POS |
| 7 | 40K LOX S/O | 3 | | 100 | 200 | Pc OK | | |
| 8 | 40K LOX S/O | 3 | | Close | 200 | C/O | LOX S/O Micro2 | 3 |

|◁ ◁ ▷ ▷|\\Test Information\\Events\\Pseudo Data\\Sequence Labels\\Valves\\RedBlue Lines\\Timers\\Options\\Usage Not

FIG.14

| | A | B | C | D | E | F | G | H | I | J | K |
|---|---|---|---|---|---|---|---|---|---|---|---|
| 1 | Description | Type (Red/Blue Line) | Measurement | Limit | Units | Type of Limit (Min/Max) | Arm | Disarm | Delay [sec] | Action if violated | Status |
| 2 | Water Pressure OK | BL | P6 | 3500 | psig | Min | -3 | Pc OK | 0 | Do Not Start | Active |
| 3 | Coolant Inlet P Low | RL | P1 | 3000 | psig | Min | F/C | C/O | 0.08 | C/O | Active |
| 4 | Coolant Water P Low | RL | P2 | 1500 | psig | Min | LOX S/O Micro1 | C/O+1.4 | | C/O | Active |
| 5 | Coolant T High | RL | T1 | 220 | R | Max | F/C | C/O | 0 | C/O | Active |
| 6 | LOX Venturi P High | RL | P3 | 2200 | psig | Max | F/C | C/O | 0.02 | C/O | Active |

|◁ ◁ ▷ ▷|\ Test Information \ Events \ Pseudo Data \ Sequence Labels \ Valves \ RedBlue Lines \ Timers \ Options \ Usage Notes \ Lists /

FIG.15

| | A | B | C | D |
|---|---|---|---|---|
| 1 | Timer Name | Arm | Total Duration (seconds) | Expected Duration [% of total duration] |
| 2 | Ignition Detect | F/C+2 | 2 | 75 |
| 3 | Delay For Closed Loop Control | Fuel S/O Micro1+.5 | 1 | 60 |
| 4 | Delay for Fuel Press & Temp Checks | Delay For Closed Loop Control | 1.5 | 50 |
| 5 | Duration at 1st Fuel Temp | Pc OK | 5 | 100 |
| 6 | Duration at 2nd Fuel Temp | Duration at 1st Fuel Temp | 5 | 100 |

|◁ ◁ ▷ ▷|\ Test Information \ Events \ Pseudo Data \ Sequence Labels \ Valves \ RedBlue Lines \ Timers \ Options /

FIG.16

|   | A | B | C |
|---|---|---|---|
| 1 | Parameter | Description | Expected Time (seconds) |
| 2 | Fuel Pressure OK | P1178 | Ignition Detect−1 |
| 3 | Fuel Temp OK | T1160 | 4.8 |
| 4 | Pc OK | P7189 | 5 |

|◁ ◁ ▷ ▷|\ Test Information ╱ Events ╲ Pseudo Data ╱ Sequence Labels ╱

FIG.17

SEQUENCE DIAGRAM SYSTEM

BACKGROUND

The present disclosure relates to a system which produces sequence diagrams for rocket engine and rocket engine component hot-fire test from a spreadsheet input.

Sequence diagrams have been utilized as an effective tool to communicate hot-fire test sequence logic. The sequence diagram contains all logic required to set up sequence of the systems (timers, valve commands, redlines, etc). The sequence diagram graphical representation facilitates identification of sequence errors before the error may result in an abort of the actual test.

SUMMARY

A method of generating a test sequence diagram according to an embodiment includes: inputting a plurality of actions for a hot-fire test; linking a first action of the plurality of actions with a second action of the plurality of actions; and generating a test sequence diagram which maintains the linking.

A method of generating a test sequence diagram according to an embodiment includes: inputting a plurality of valve actions for a hot-fire test; linking a first action of said plurality of valve actions with a second action of said plurality of valve actions; and generating a test sequence diagram which maintains the linking.

A method of generating a test sequence diagram for a hot-fire test according to an embodiment includes: inputting a plurality of valve actions comprising opening an oxygen valve, opening an ignition valve, and opening a fuel valve; linking the action of opening the ignition valve with the action of opening the fuel valve with a delay; and generating a test sequence diagram which maintains the delay.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 10A is a spreadsheet for a Sequence Diagram as input into the Sequence Diagram Tool; and FIG. 10B is a sequence Diagram generated by the Sequence Diagram Tool in response to the spreadsheet of FIG. 10A.

FIG. 11 illustrates an example test information tab.

FIG. 12 illustrates an example events tab.

FIG. 13 illustrates an example sequence label tab.

FIG. 14 illustrates an example valve tab.

FIG. 15 illustrates an example RedBlue Lines tab.

FIG. 16 illustrates an example timer tab.

FIG. 17 illustrates an example Pseudo Data tab.

DETAILED DESCRIPTION

Figure 1:
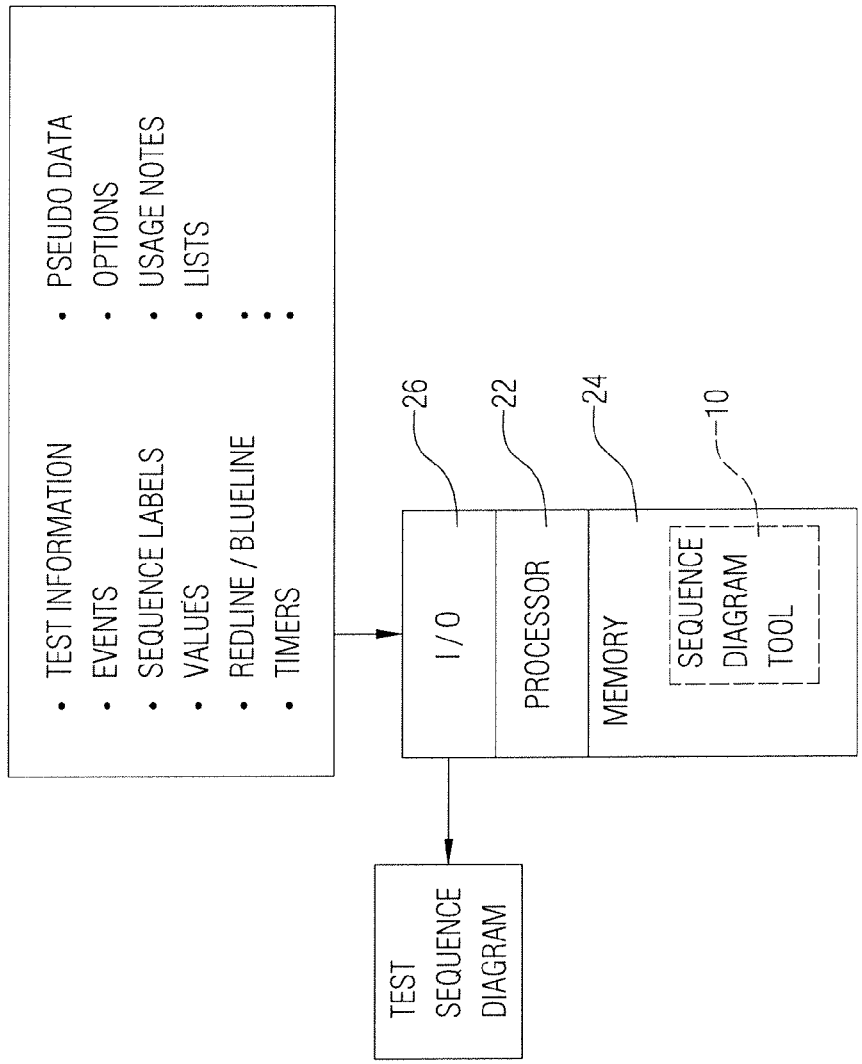
FIG. 1 is a schematic block diagram a computing device which can be used to implement various functionality, such as that attributable to the Sequence Diagram Tool according to one non-limiting embodiment disclosed herein.

FIG. 1 schematically illustrates a Sequence Diagram Tool 10 that provides a user friendly and easily modifiable sequence diagram that links all of a test sequence information and logic together for display in a schematic visual manner. The Sequence Diagram Tool generates a sequence diagram containing all logic required to visualize hot-fire test logic and to reduce hot-fire sequence errors that may occur due to misunderstanding of the linked logic within a test sequence. The fully coupled and automated sequence diagram tool will preclude errors since the entire test logic will be presented in an easy to understand sequence diagram.

The Sequence Diagram Tool may operate with spreadsheet and presentation software which provides a work sheet format that is arranged in the manner of a mathematical matrix and contains a multicolumn analysis of related entries for reference to define and graphically display a test sequence. The test sequence logic is defined using a series of tables in a spreadsheet format. The tables include, for example, Events, Valves, Redlines, Timers, etc. that represent a test sequence. The software produces a graphical representation of the test sequence as the sequence diagram.

The software may manipulate and display the full test sequence, a portion of the test sequence, or a portion of the test logic (valves only, etc.) via a graphical user interface (GUI).

It should be noted that a computing device 20 can be used to implement various functionality, such as that attributable to the Sequence Diagram Tool 10. In terms of hardware architecture, such a computing device 10 can include a processor 22, memory 24, and one or more input and/or output (I/O) device interface(s) 26 that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor 22 may be a hardware device for executing software, particularly software stored in memory 24. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory 24 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 24 may incorporate electronic, magnetic, optical, and/or other types of storage media. Note that the memory can also have a distributed architecture, where various components are situated remotely from one another, but can be accessed by the processor 22.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices 26 that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Moreover, the Input/Output devices may include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor 22, and then executed.

Sequence Spreadsheet

The sequence spreadsheet is the container for all the hot-fire test logic. The sequence may be defined and saved in the required spreadsheet format before a Sequence Diagram Tool Macro is initiated. It should be understood that various subroutines, plug-ins and other applications or applets may alternatively or additionally utilized The sequence spreadsheet contains multiple sheets or tabs which are used to define the different aspects of the tests sequence. The tabs may be labeled: Test Information, Events, Sequence Labels, Valves, RedBlue Lines, Timers, Pseudo Data, Options, Usage Notes and Lists. The following is a summary of each of the tabs' function and use.

Test Information

FIG. 11 illustrates an example test information tab. The Test Information tab displays specific information about the test article, test facility and test number and date. The test information can be listed along the top of the sequence diagram if desired.

Events

FIG. 12 illustrates an example events tab. The events tab defines specific events that other items can reference. Only name and time of occurrence are required to define an event. Events can be referenced by other items and also event time can reference another item to define the time. Typical hot-fire events include items like start (F/C), cutoff (C/O), ignition, and mainstage. Once an event is defined the Sequence Diagram Tool Macro will draw a dashed line vertically across the page to signify an event occurs.

Sequence Labels

FIG. 13 illustrates an example sequence label tab. The sequence label tab defines ranges of time that an item occurs. Typically this is used to define different test stages and the first column is labeled as such. A start time and end time defines a sequence label. Typical sequence labels include mainstage, chill, pre-ignition, fire, etc.

Valves

FIG. 14 illustrates an example valves tab. The valves tab defines the valves required for the test sequence and their timing and motion position. Each row in the valves tab is used to define one action (open, closed, % open) of a valve. Each valve may have multiple rows to define the motion of the valve over the entire test sequence. To completely define a valve, multiple columns are often required. Valve I.D. is used to determine the end of one valve definition and the beginning of the next valve definition. The Valve I.D. may be a unique number to facilitate arrangement for each record or row. The first row for each valve may have an Initial State, either Open or Closed. Subsequent rows of the same valve do not require an initial state as subsequent valve positions are calculated by the Sequence Diagram Tool Macro. Each row may have an Action defined for that row, either Open, Close, or a percentage open value. The Ramp Rate may also be defined in the Ramp Rate column. The Trigger column defines the time at which the valve begins to move. The trigger can be a time or linked to another item such as an event or a timer. The Position Sensor Name column can be used if another item needs to be connected to the end of the valve ramp. If a position sensor name is used, the Position Sensor Type column must be used to define a position sensor (POS) or microswitch (MS). This will only effect how the sensor gets displayed on the output diagram. The valves are the first items displayed in the sequence diagram Red Lines/Blue Lines FIG. 15 illustrates an example RedBlue Lines tab. Redlines are test parameters that must not be violated for a safe test. If any of the redlines are violated, the sequence logic automatically changes the future events. This is usually an immediate and direct path to cutoff. Bluelines are Start OK parameters. If any of these parameters are violated, the automatic sequence cannot proceed. The RedBlue Lines tab defines the redlines and bluelines associated with the test sequence. The Description displays the name of the redline or blueline on the left of the sequence diagram. The Type column displays RL for redline or BL for blueline which affects the color of the line. The Measurement column is used for further information if the table is used in a test request type document. The Limit, Units and Type of Limit cells will be displayed on the diagram near the activation of the redline or blueline. The Delay and Action if Violated columns provide a delay time prior to the action if the delay is exceeded. The Status column determines whether to draw that particular redline. If the status is Active the redline will be drawn. If Inactive the redline will not be drawn. The redlines and bluelines are typically the last element displayed in the sequence diagram.

Timers

FIG. 16 illustrates an example timer tab. The Timer tab defines the timers associated with the test sequence. Timers are often used as a delay, or as a waiting period for an event to happen. Timers may be used in either role with proper definition in the spreadsheet. Timer Name, Arm and Total Duration columns define a Timer. To use the timer as a delay only for use with an action to occur at expiration, define the Expected Duration cell as 100 (% of total duration), or leave it blank. To use the timer as a waiting period for an event to occur before the timer expires, the Expected Duration cell defines when other items defined by the Timer occur (1-100).

Pseudo Data

FIG. 17 illustrates an example Pseudo Data tab. The Pseudo Data tab defines a data trace which may be used to generally define when an item is expected to occur. For example, if waiting for a pressure to reach a certain level, a pseudo data item graphically depicts when the pressure is expected to reach that point. The Parameter name, Description and Expected Time are required to define the Pseudo Data trace.

Options

The options tab contains a list of items that can be defined for use in the portion of the sequence diagram tool. The items in the Options tab control the output parameters and display of the sequence diagram. Items can be changed in the options tab and they will be loaded into the presentation software when the spreadsheet is opened by the Sequence Diagram Tool Macro.

Sequence Diagram Tool Macro

The Sequence Diagram Tool Macro graphically displays the test sequence information contained in the sequence diagram input spreadsheet. The sequence may be defined and saved in the required spreadsheet format for operation on by the Sequence Diagram Tool Macro. The Sequence Diagram Tool Macro essentially reads in the data and sequence logic from the spreadsheet for display in a visual manner as the test sequence diagram. In one non-limiting embodiment, the Sequence Diagram Tool Macro may utilize, for example only, Visio or other drawing and diagramming programs that may include a variety of pre-drawn shapes and picture elements as well as user-defined elements.

Figure 3:
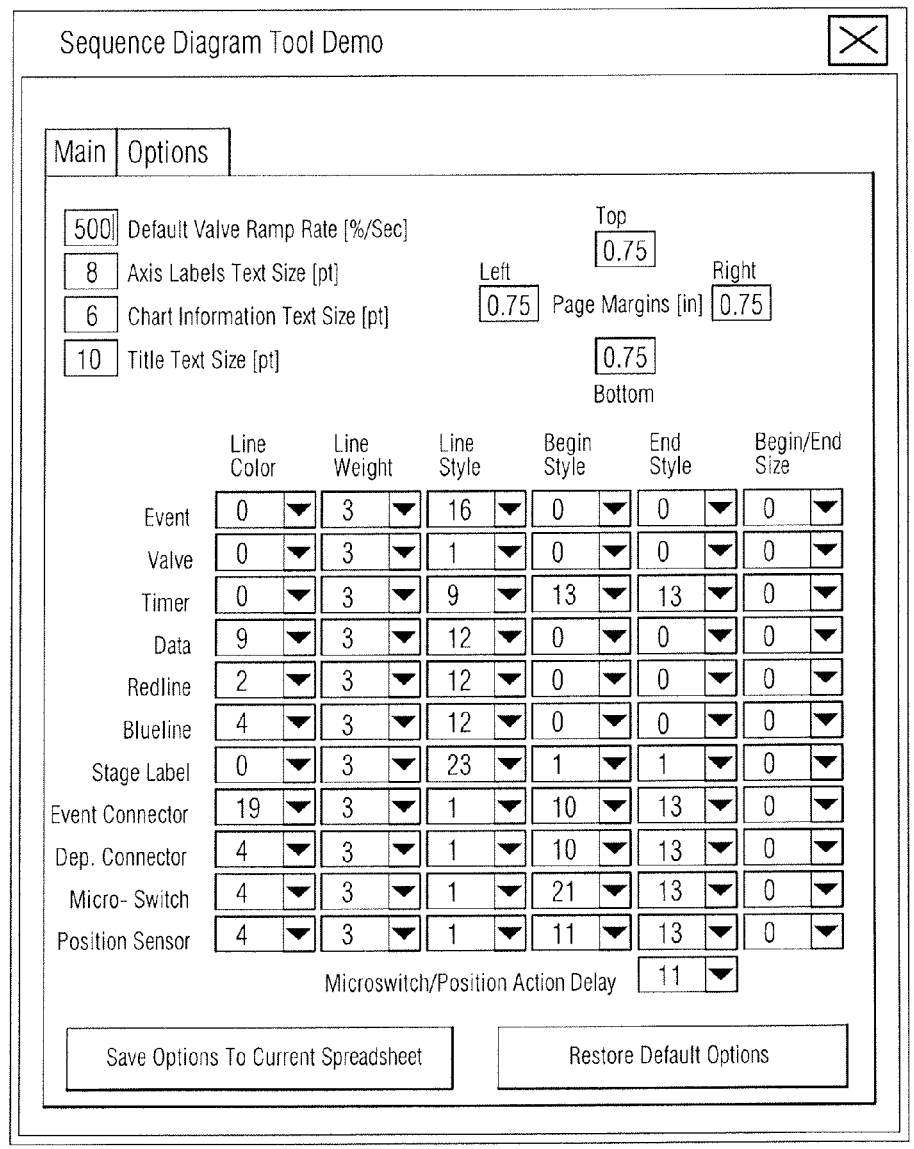
FIG. 3 is a schematic of another graphical user interface (GUI) for the Sequence Diagram Tool.

The Sequence Diagram Tool Macro in the disclosed embodiment, includes a Main tab (FIG. 1) and an Options tab (FIG. 3). The buttons, text fields and check boxes on the tabs generate and manipulate the sequence diagram tool output.

Figure 2:
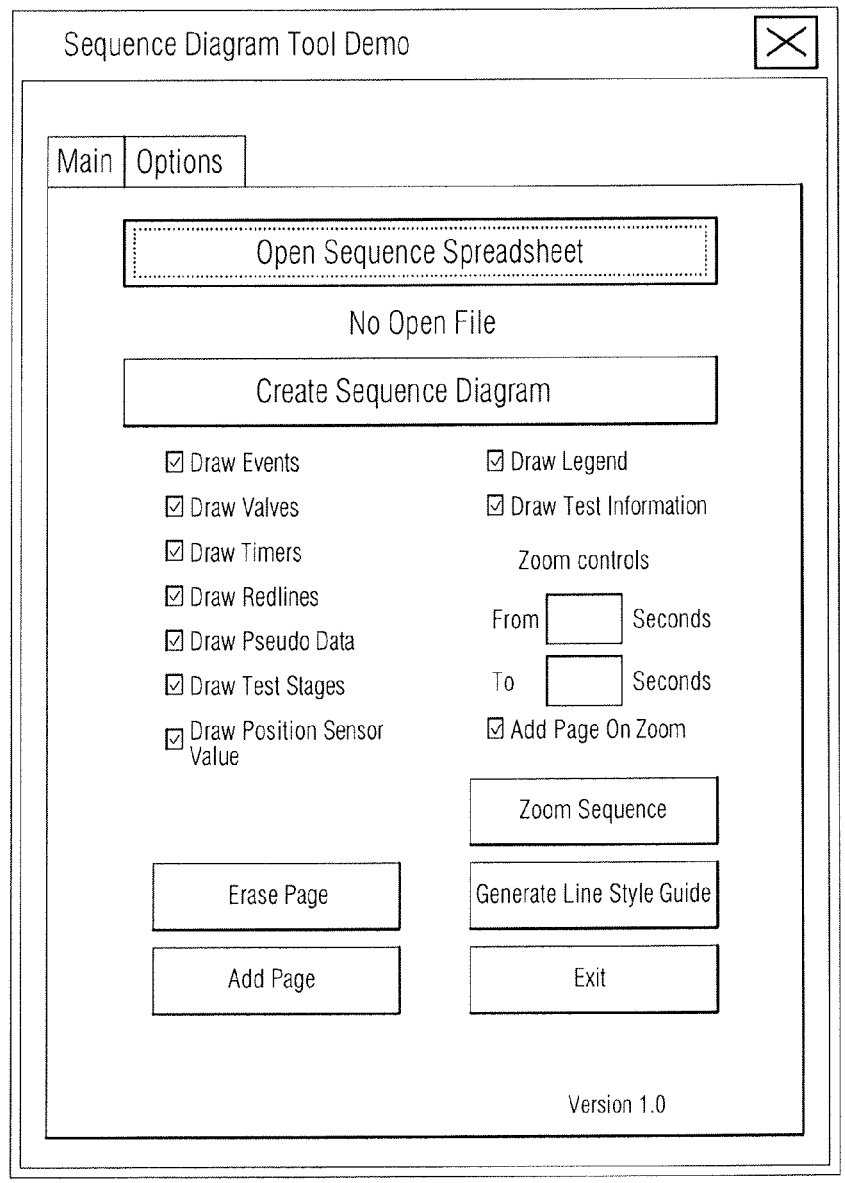
FIG. 2 is a schematic of a graphical user interface (GUI) for the Sequence Diagram Tool.

Referring to FIG. 2, the Main tab contains the buttons and checkboxes commonly used to generate and manipulate the test sequence diagram. The check boxes allow the user to toggle display of the different features of the sequence.

Referring to FIG. 3, the Options tab contains the buttons and checkboxes used to manipulate the parameters used for drawing the test sequence diagram. The values in the Options tab are loaded from the sequence spreadsheet Options tab when it is opened by the Sequence Diagram Tool Macro.

The Line Styles can be manipulated using the matrix of drop down boxes in the lower portion of the options tab. Each number corresponds to a different color, weight, style (dashed, dotted, etc.) or arrow that can be used for each of the items listed down left side of the matrix.

Creation of a Visual Sequence Diagram Example

Figure 4:
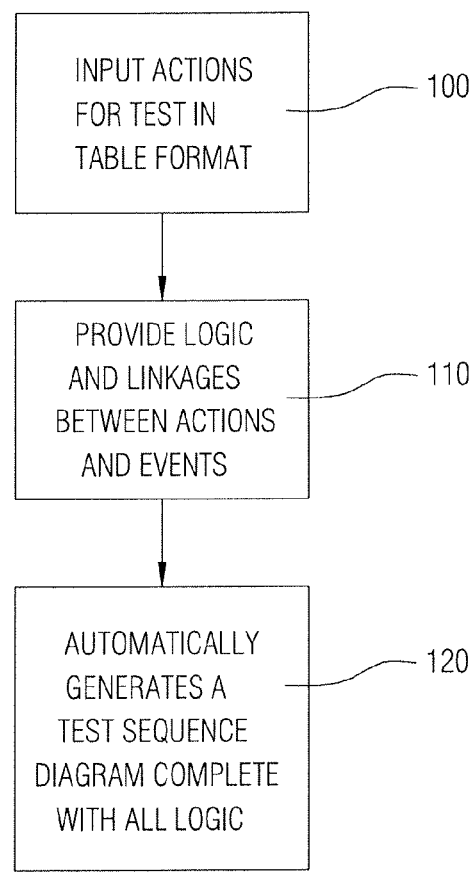
FIG. 4 is a schematic flowchart representation of the Sequence Diagram generation by the Sequence Diagram Tool.

Referring to FIG. 4, the first step in creating a visual sequence diagram using the Sequence Diagram Tool Macro is to define the test sequence in a spreadsheet (step 100). The sequence is first defined on a spreadsheet of the appropriate format. The Sequence Diagram Tool Macro reads in the tabs of the spreadsheet for specific information at defined locations in the spreadsheet to generate links between particular related actions (step 110).

The test article and facility specifics are input on the 'Test Information' tab. As an example fill in the cells to read the following: This information will be displayed at the top of the diagram.

| Test Article | New Combustor |
|---|---|
| Test Facility | Old Test Stand |
| Test Number | 001 |
| Date | Nov. 14, 2006 |
| Revision | Rev A. |

Next, test sequence data is entered at the 'Events' tab first. These items will be displayed as vertical dashed lines across the entire page of the sequence diagram. Items can be dependent on or linked to other items by listing their names. The 'Events' tab will be defined by a timer later.

| Event name | Time |
|---|---|
| Start | 0 |
| Cutoff | |

Next, the 'Sequence Labels' tab data is entered. These items will be displayed across the top of the sequence diagram. Notice that Mainstage does not have a start time yet. This will be defined later using a valve position sensor.

| Test Stage | Start | End |
|---|---|---|
| Chill | −5 | Start |
| Mainstage | | Cutoff |
| Shutdown | Cutoff | Cutoff + 5 |

Next the 'Valves' tab data is entered. The Valves are the first items to be drawn in y-axis of the sequence diagram. The Valves are drawn in the order they are placed in the spreadsheet. The Main Fuel Valve open trigger is defined at a later point using a timer. Action, Ramp Rate and Position Sensor Type data cells may be provided.

| Valve Name | Valve I.D. | Initial State | Action (Open, Close, X %) | Ramp Rate (%/s) | Trigger (Time/Event/Timer) | Position Sensor Name | Position Sensor Type [MS/POS/%] |
|---|---|---|---|---|---|---|---|
| Main Fuel Valve | 1 | Closed | Open | 300 | | MFV Pos 1 | POS |
| Main Fuel Valve | 1 | | Close | 300 | Cutoff + 3 | | |
| Main Ox Valve | 2 | Closed | 50 | 200 | Start | | |
| Main Ox Valve | 2 | | 100 | 200 | MFV Pos 1 | | |
| Main Ox Valve | 2 | | Close | 200 | Cutoff | | |

Next the 'Timer' tab data is entered. The timers are drawn after the valve along the y-axis of the sequence diagram. Defined below are an Ignition Detect timer that are linked to wait for some ignition signal. The signal is expected to occur at 75% of timer expiration. This expected occurrence time is necessary for visualization purposes. If any items are linked and thus dependent on this timer they will be displayed as activation at 75% of the total timer time. Also defined is a duration timer of 10 seconds which is expected to run to expiration, or 100%.

| Timer Name | Arm | Total Duration (seconds) | Expected Duration [% of total duration] |
|---|---|---|---|
| Ignition Detect | Start | 3 | 75 |
| Duration | MFV Pos 1 | 10 | 100 |

Next, the 'Pseudo Data' tab data is entered. The data contained on this tab is a way to display a measurement or data parameter that might be useful for visualization or that might be triggering some other action. In this case, a chamber pressure that might be used for ignition detection is simulated. Notice the Expected time is 75% of 3 seconds, or the same as the expected Ignition Detect timer signal.

| Parameter | Description | Expected Time (seconds) |
|---|---|---|
| Pc | Chamber Pressure | 2.25 |

Finally, the 'RedBluelines' tab data is entered. This data will be drawn last on the y-axis of the sequence diagram. Furthermore, one Blueline and one Redline for this simple test setup.

| Description | Type (Red/Blue Line) | Measurement | Limit | Units | Type of Limit (Min/Max) | Arm | Disarm | Delay [sec] | Action if violated | Status |
|---|---|---|---|---|---|---|---|---|---|---|
| Pc OK | BL | Pc | 80 | psig | min | Start | MFV Pos 1 | 0 | Cutoff | Active |
| Fuel Temp Max | RL | Tf | 200 | R | max | Ignition Detect | Cutoff | 0 | Cutoff | Active |

A user may then review and fill in the blanks that were left in some of the previous tabs. In the 'Events' tab, Cutoff will come at the end of the Duration timer.

| Event name | Time |
|---|---|
| Start | 0 |
| Cutoff | Duration |

In the 'Sequence Labels' tab the Main stage label will start at the Main Fuel Valve Position sensor, MFV Pos 1.

| Test Stage | Start | End |
|---|---|---|
| Chill | −5 | Start |
| Mainstage | MFV Pos 1 | Cutoff |
| Shutdown | Cutoff | Cutoff + 5 |

In the 'Valves' tab, the Main Fuel Valve will open at the Ignition Detect timer.

| Valve Name | Valve I.D. | Initial State | Action (Open, Close, X %) | Ramp Rate (%/s) | Trigger (Time/Event/Timer) | Position Sensor Name | Position Sensor Type [MS/POS/%] |
|---|---|---|---|---|---|---|---|
| Main Fuel Valve | 1 | Closed | Open | 300 | Ignition Detect | MFV Pos 1 | POS |
| Main Fuel Valve | 1 | | Close | 300 | Cutoff + 3 | | |
| Main Ox Valve | 2 | Closed | 50 | 200 | Start | | |
| Main Ox Valve | 2 | | 100 | 200 | MFV Pos 1 | | |
| Main Ox Valve | 2 | | Close | 200 | Cutoff | | |

At this point, the parameters are defined and ready for input in the Sequence Diagram tool.

Use the Sequence Diagram Tool

Figure 5:
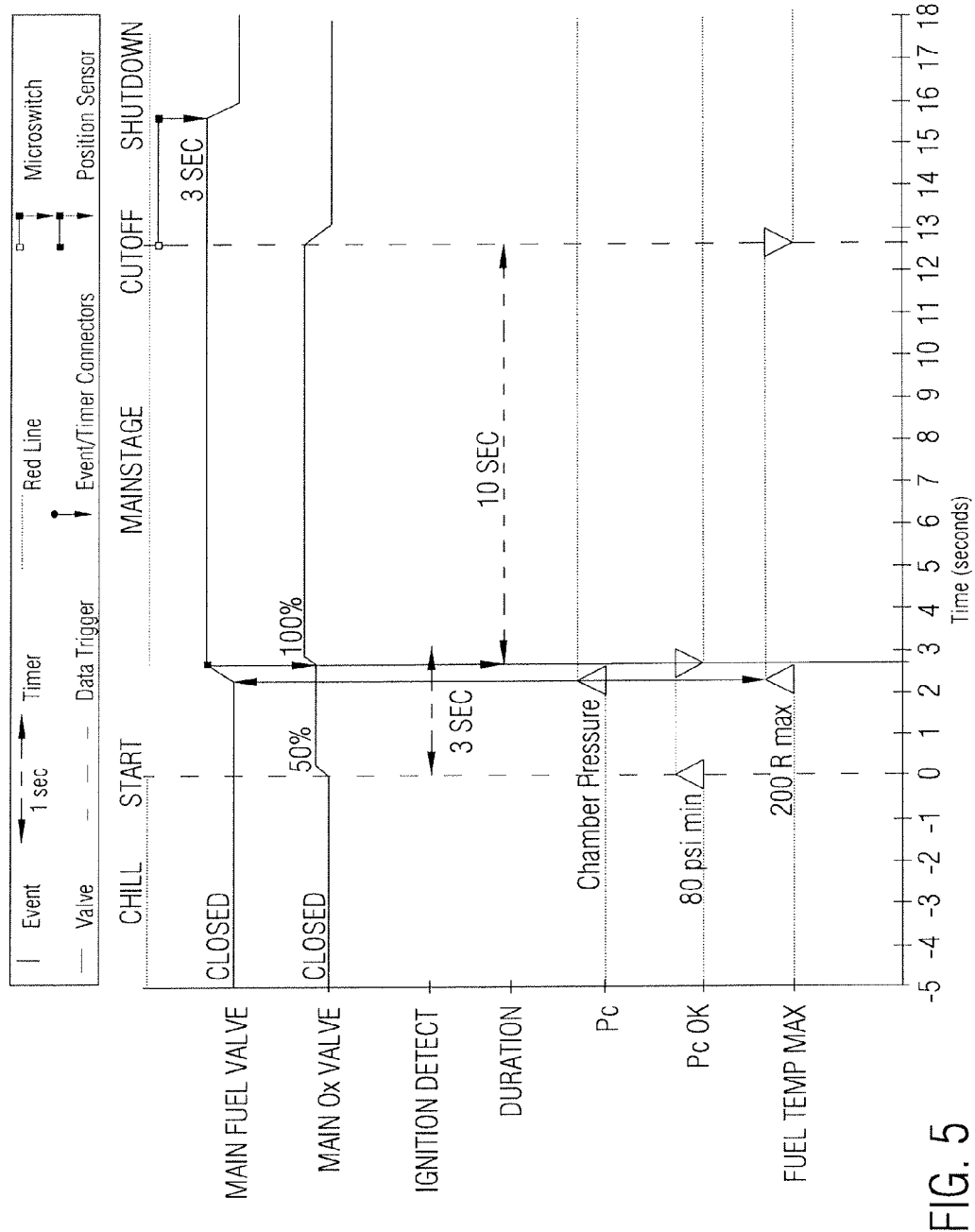
FIG. 5 is a schematic of one Sequence Diagram generated by the Sequence Diagram Tool.

The Sequence Diagram Tool file is opened and the 'Create Sequence Diagram' button is executed such that the sequence diagram will be generated on the active sheet (step 120; FIG. 5).

The GUI (FIGS. 2 and 3) for the Sequence Diagram Tool Macro contains other options that cause the output of the diagram. Each of the separate items in the spreadsheet can be turned on and off in the diagram by checking the appropriate check box and recreating the diagram. Line colors and styles, text size and page margins can be changed by using the check boxes and text fields in the 'Options' tab.

Sequence Diagram Tool Actions Linkage Example

Figure 6:
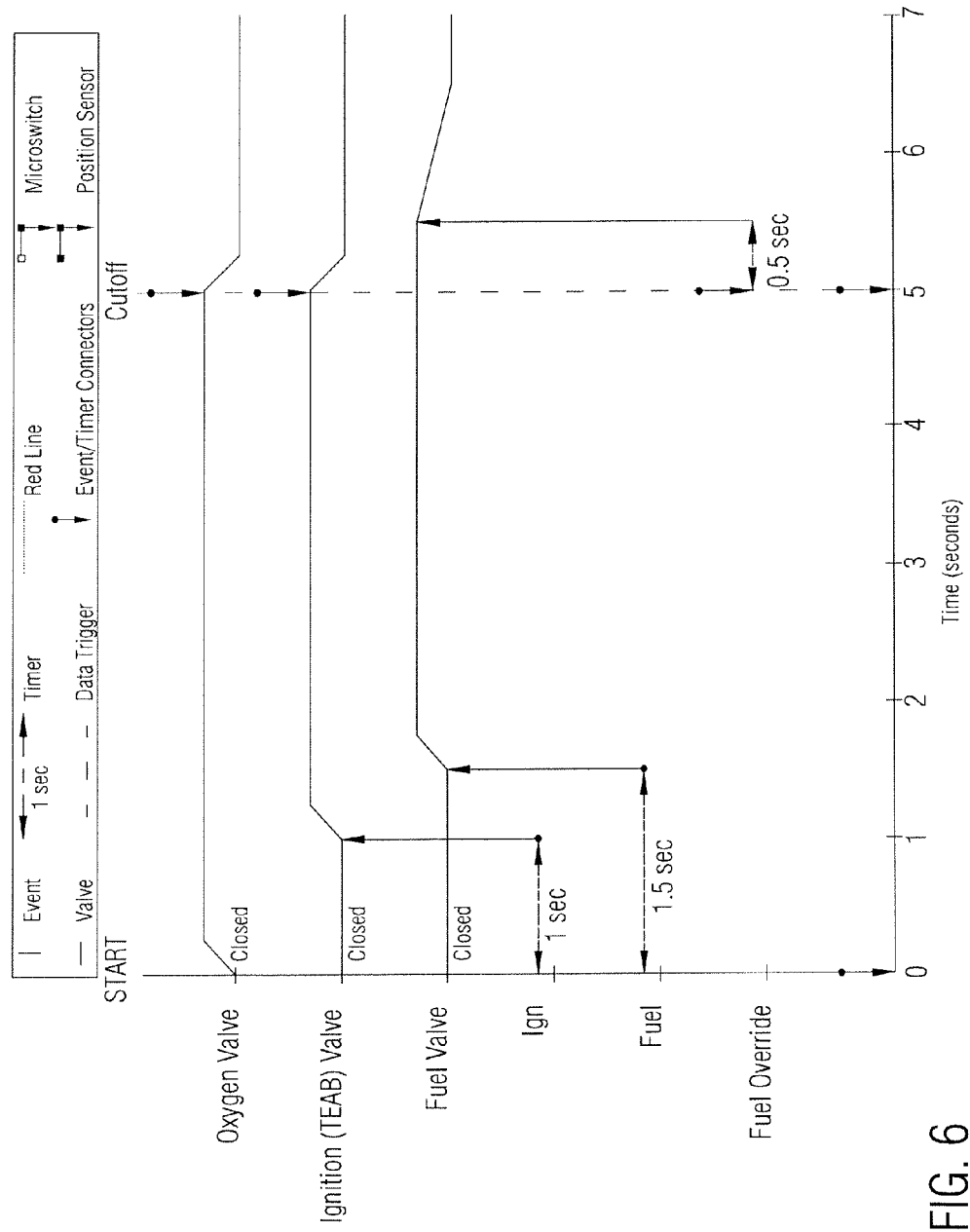
FIG. 6 is a schematic of a desired Sequence Diagram.

Referring to FIG. 6, a representative test involving three (3) valves to control a rocket engine hot fire test within a combustion chamber: an Oxygen Valve, an Ignition Valve, and a Fuel Valve. The design intent is to first open the Oxygen Valve, then the Ignition Valve which controls the flow of a hypergol fuel (TEAB) that spontaneously ignites with the Oxygen already present in the combustion chamber. Once ignition is established, the main Fuel Valve is then opened. The small combustion from the Oxygen and Ignition hypergol provide an ignition source for the main fuel as soon as the main fuel enters the rocket combustion chamber.

If the ignition source from the ignition fuel (TEAB) is delayed until the main fuel flows into the combustion chamber, the resulting ignition of the main fuel and oxygen may potentially lead to a rapid combustion of all of the fuel and oxygen in the combustor which may cause overpressures and potential chamber failure. The main concern in this simplified example is to assure that ignition occurs before the main fuel is introduced.

The following figures indicate examples of how such a potential problem is avoided through operation of the Sequence Diagram Tool.

Figure 7:
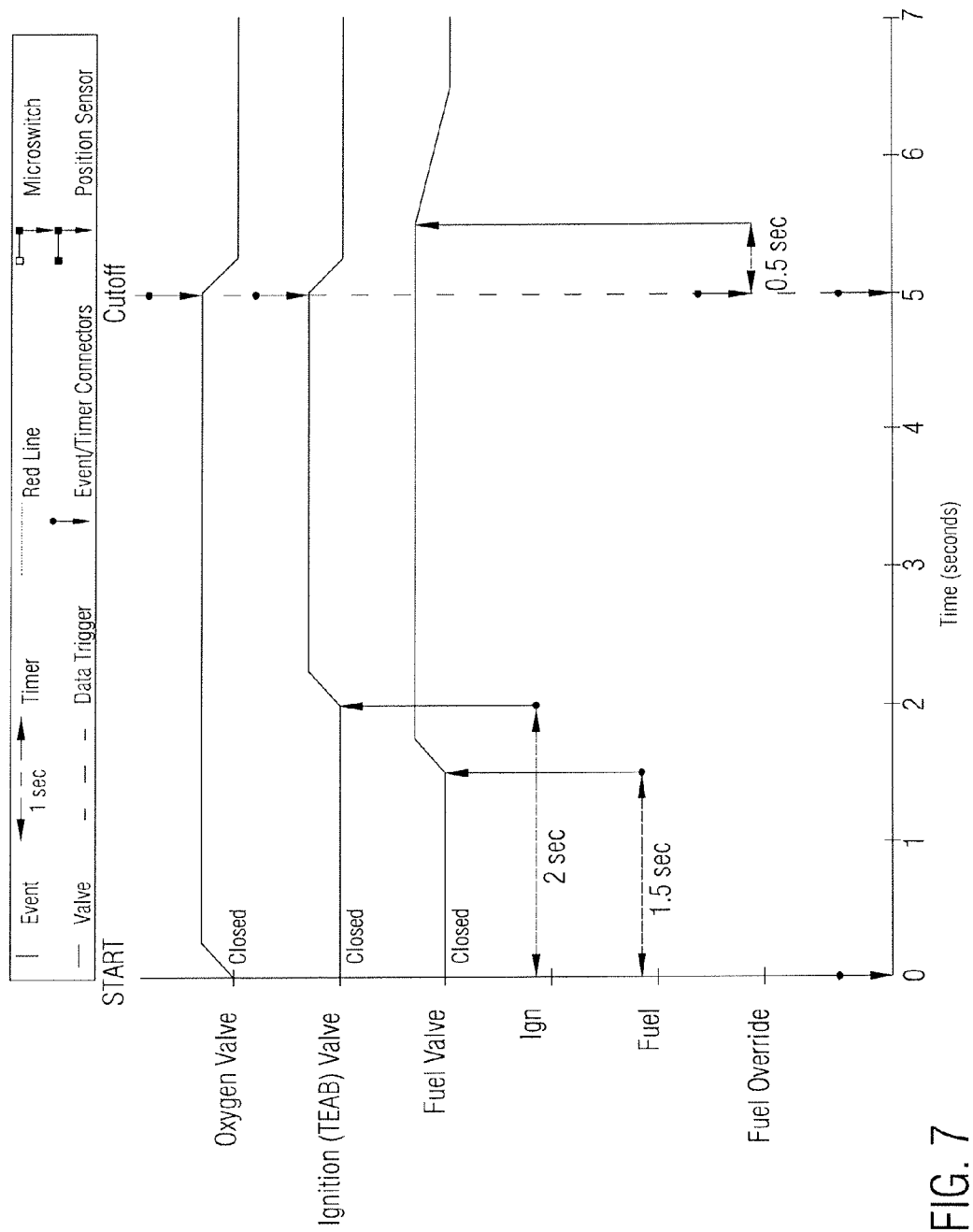
FIG. 7 is a schematic of the Sequence Diagram of FIG. 6 with an increased ignition valve opening time which may lead to a rapid combustion or detonation of the fuel and oxygen in the combustion chamber which may result in failure of the combustion chamber during a hot fire test.

FIG. 6 illustrates the desired test sequence as described above. Now consider that the Ignition Valve is to be delayed one half a second to provide for example, better quality oxygen. FIG. 7 indicates the Ignition Valve delay (without the realization that such a change may cause a sequence problem). Although this is readily identifiable in this example, it should be understood that a more complex sequencing relationship would be significantly more difficult to identify. For instance, incorporation of the Ignition Valve delay without usage of the Sequence Diagram Tool, a user may mistakenly delay the Ignition Valve a half a second without any other concern then proceed to test such that the sequence illustrated in FIG. 7 may potentially result in a chamber failure.

Figure 8:
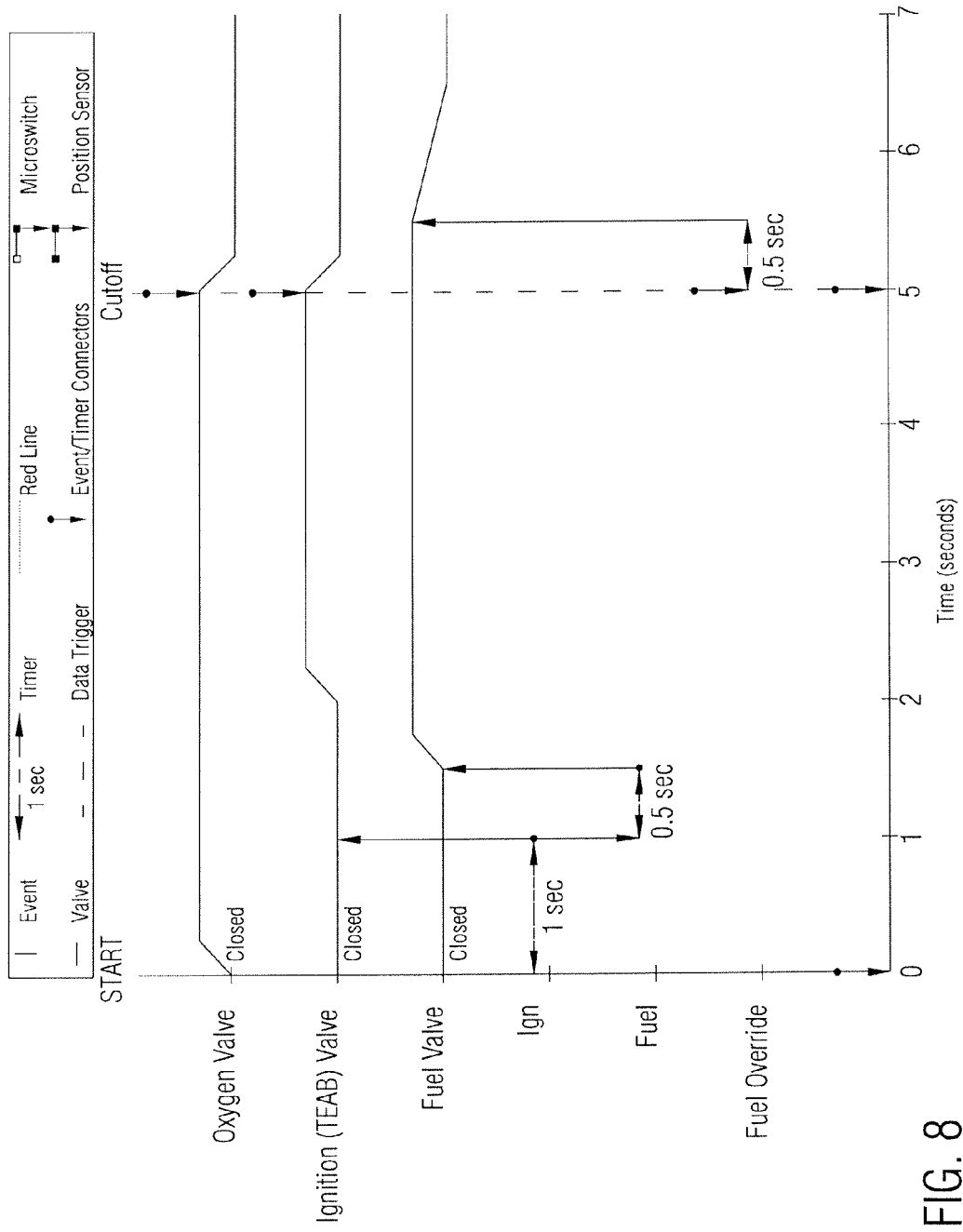
FIG. 8 is a schematic of the Sequence Diagram of FIG. 6 generated by the Sequence Diagram Tool with logic linking ignition and fuel values to preclude detonation.

However, operation of the Sequence Diagram Tool makes such a potential issue readily apparent that the ignition is going to occur after the Main Fuel is open (FIG. 8). That is, the Sequence Diagram Tool links particular actions such that an inoperative sequence diagram is readily avoided so that an actual test and potential failures are avoided.

Figure 9:
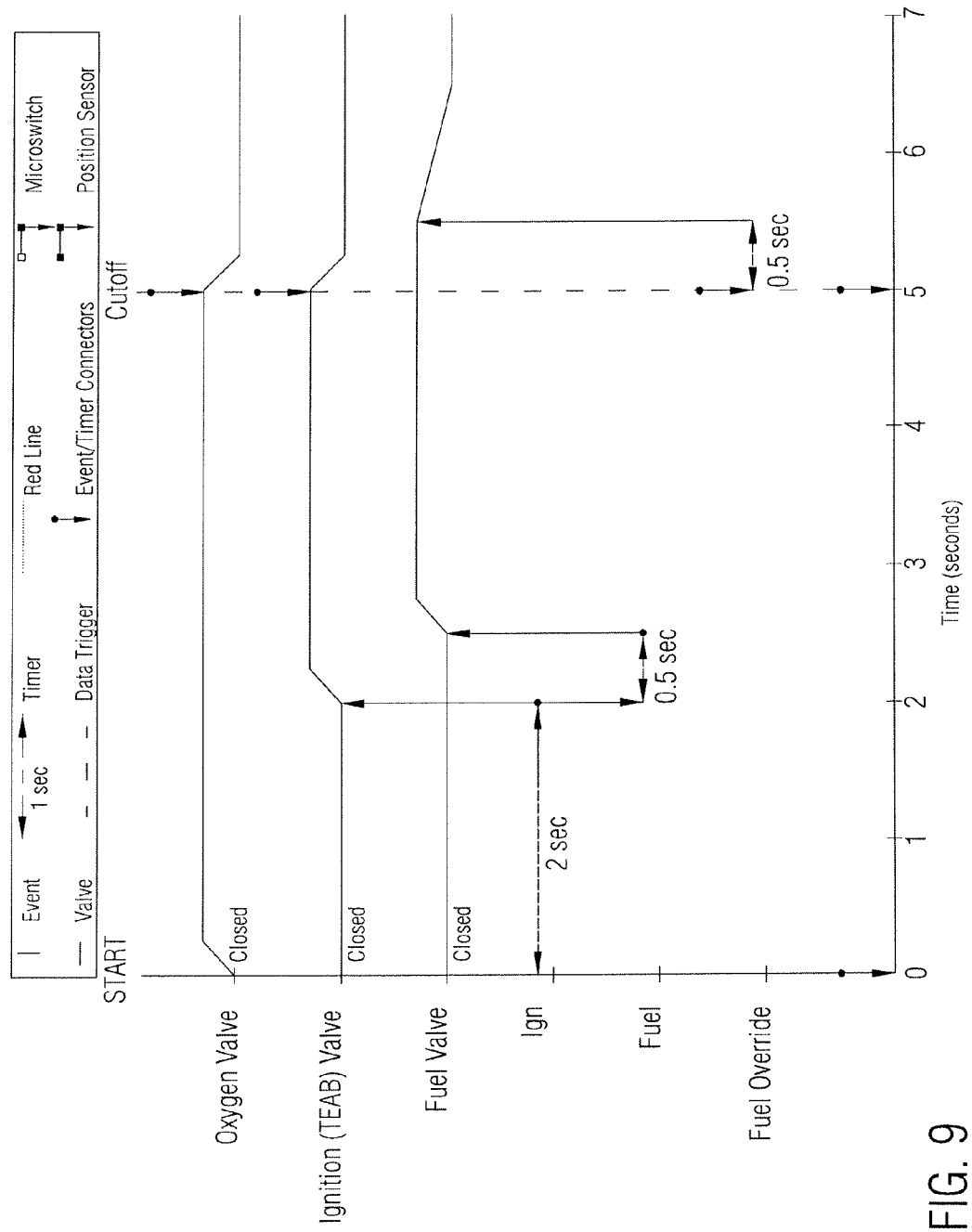
FIG. 9 is a schematic of the Sequence Diagram of FIG. 8 generated by the Sequence Diagram Tool with an increased ignition valve opening time with logic linking valves properly sequencing with increase ignition value delay.

FIG. 8, for example, illustrates linkage between the particular actions of the Fuel Valve and the Ignition Valve by illustration of the 0.5 second delay hard logic. The test valve sequence is identical to that in FIG. 6, however, the Fuel Valve open action is now linked through the Sequence Diagram Tool to always maintain the delay, for example 0.5 seconds after the Ignition Valve, regardless of other actions within the sequence. Any change to the Ignition Valve delay, the Ignition Valve 0.5 second delay relationship to the Fuel Valve will always be maintained. FIG. 9 illustrates that the sequence diagram tool maintains this 0.5 second delay even when the Ignition Valve open action is increased to 2 seconds. Notably, the sequence diagram tool, through this linkage of actions, has shifted the fuel valve open signal to 2.5 seconds to maintain the 0.5 second delay. It should be understood that numerous linkages may be provided within a single sequence diagram and any such linkages would ripple through the sequence diagram.

As shown in FIGS. 10A and 10B, a sequence diagram may contain hundreds of actions. In these embodiments, a delay such as that detailed in the example discussed above, a conflict may otherwise be overlooked. Such an overlooked delay may potentially result in an inoperative sequence that only becomes identified on a test stand with the associated potential for equipment damage.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed is:

1. A method of generating a test sequence diagram comprising:
   inputting a plurality of actions for a hot-fire test into a sequence diagram tool on a computer;
   linking a first action of the plurality of actions with a second action of the plurality of actions using the sequence diagram tool;
   generating a test sequence diagram which maintains the linking using the sequence diagram tool;
   editing said first action of the plurality of actions in said test diagram, thereby causing said edits to affect a corresponding change in the second action as a result of said linking.

2. A method as recited in claim 1, wherein inputting a plurality of actions for the hot-fire test further comprises:
   inputting a first valve actuation as the first action.

3. A method as recited in claim 2, wherein inputting a plurality of actions for the hot-fire test further comprises:
   inputting a second valve actuation as the second action.

4. A method as recited in claim 3, wherein linking the first action of the plurality of actions with the second action of the plurality of actions further comprises:
   linking the first action with the second action with a delay.

5. A method as recited in claim 1, wherein inputting a plurality of actions for the hot-fire test further comprises:
   inputting an event as the first action.

6. A method as recited in claim 5, wherein linking the first action of the plurality of actions with the second action of the plurality of actions further comprises:
   linking activation of a first valve in response to the event.

7. A method as recited in claim 6, wherein linking the first action of the plurality of actions with the second action of the plurality of actions further comprises:
   closing the first valve.

8. A method as recited in claim 6, wherein inputting a plurality of actions for the hot-fire test further comprises:
   opening the first valve.

9. A method as recited in claim 6, wherein linking the first action of the plurality of actions with the second action of the plurality of actions further comprises:
linking the event to a time period.

10. The method of claim 1, wherein said step of inputting a plurality of actions for a hot-fire test further comprises entering said plurality of actions into a computerized database and wherein said step of linking a first action of the plurality of actions with a second action of the plurality of actions comprises linking a first computer entry corresponding to said first action and a second computer entry corresponding to said second action such that an alteration to said first or second computer entry affects a corresponding alteration in the other of said first or second computer entry.

11. The method of claim 1, wherein said step of linking a first action of the plurality of actions with a second action of the plurality of actions creates a link between said first action and said second action such that an alteration to one of said first or second action causes a corresponding alteration to the other of said first or second action.

12. A method of generating a test sequence diagram comprising:
inputting a plurality of valve actions for a hot-fire test into a sequence diagram tool on a computer;
linking a first action of said plurality of valve actions with a second action of said plurality of valve actions using the sequence diagram tool; and
generating a test sequence diagram which maintains the linking using the sequence diagram tool; and
editing said first action of the plurality of actions in said test diagram, thereby causing said edits to affect a corresponding change in the second action as a result of said linking.

13. A method as recited in claim 12, wherein inputting the plurality of valve actions for the hot-fire test further comprises:
inputting a first valve actuation as a first valve action of the plurality of valve actions.

14. A method as recited in claim 13, wherein inputting the plurality of valve actions for the hot-fire test further comprises:
inputting a second valve action as a second valve action of the plurality of valve actions.

15. A method as recited in claim 14, wherein linking the first action of said plurality of valve actions with the second action of said plurality of valve actions further comprises:
linking the first action with the second action with a delay.

16. The method of claim 12, wherein said step of linking a first action of said plurality of valve actions with a second action of said plurality of valve actions creates a link between said first action and said second action such that an alteration to one of said first or second action causes a corresponding alteration to the other of said first or second action.

17. A method of generating a test sequence diagram for a hot-fire test comprising:
inputting a plurality of valve actions into a sequence diagram tool on a computer, wherein the plurality of valve actions comprise opening an oxygen valve, opening an ignition valve, and opening a fuel valve;
linking the action of opening the ignition valve with the action of opening the fuel valve with a delay using the sequence diagram tool; and
generating a test sequence diagram which maintains the delay using the sequence diagram tool: and
editing said first action of the plurality of actions in said test diagram, thereby causing said edits to affect a corresponding change in the second action as a result of said linking.

18. A method as recited in claim 17, wherein said linking further comprises:
adjusting the delay.

19. A method as recited in claim 18, wherein said generating further comprises:
generating the test sequence diagram which maintains the linking in response to the adjusting.

20. The method of claim 10, wherein said step of generating a test sequence diagram which maintains the linking further comprises generating a visual representation of a test sequence, and wherein said visual representation comprises a representation of said linking.

21. The method of claim 17, wherein said step of linking the action of opening the ignition valve with the action of opening the fuel valve with a delay creates a link between the action of opening the ignition valve and the action of opening the fuel valve with a delay such that an alteration to one of said action of opening the ignition valve and said action of opening the fuel valve with a delay causes a corresponding alteration to the other of said action of opening the ignition valve and said action of opening the fuel valve with a delay.

* * * * *